(12) United States Patent
Hagino et al.

(10) Patent No.: US 6,386,752 B1
(45) Date of Patent: May 14, 2002

(54) COAGULATION REACTION DEVICE

(75) Inventors: Takao Hagino; Shyoiti Gohda, both of Kanagawa; Hideyuki Yoshida, Tokyo; Kiyoshi Uchiumi, Saitama, all of (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/720,333

(22) PCT Filed: Jun. 24, 1999

(86) PCT No.: PCT/JP99/03354

§ 371 Date: Mar. 26, 2001

§ 102(e) Date: Mar. 26, 2001

(87) PCT Pub. No.: WO99/67006

PCT Pub. Date: Dec. 29, 1999

(30) Foreign Application Priority Data

Jun. 25, 1998 (JP) .............................. 10-178965

(51) Int. Cl.[7] ........................ B01D 29/64; B01D 29/075; C02F 1/52; B01F 7/20

(52) U.S. Cl. .................. 366/309; 366/307; 366/325.92; 366/264; 210/205; 210/413; 210/415; 210/219; 210/260

(58) Field of Search ................................ 366/264, 309, 366/307, 325.92; 210/205, 208, 219, 220, 256, 260, 261, 413, 414, 415, 433.1

(56) References Cited

U.S. PATENT DOCUMENTS 2,405,315 A * 8/1946 McBride
2,590,431 A * 3/1952 Rose
2,594,785 A * 4/1952 Meeker
3,923,652 A * 12/1975 Condolios et al.
3,951,803 A * 4/1976 Siegel
4,347,135 A * 8/1982 Lafosse et al.

(List continued on next page.)

FOREIGN PATENT DOCUMENTS

| EP | 0 264 900 | 4/1988 |
| EP | 0 397 864 | 11/1990 |
| EP | 0 531 747 | 3/1993 |
| GB | 2 142 839 | 1/1985 |
| JP | 61-68916 | 4/1986 |
| JP | 4-40732 | 9/1992 |
| JP | 6-238110 | 8/1994 |
| JP | 9-117610 | 5/1997 |
| JP | 10-328505 | 12/1998 |

OTHER PUBLICATIONS

Copy of specification and drawings annexed to the request of Japanese Utility Model Application No. 59–84221 (Laid–open No. 61–810) (Kurita Water Industries Ltd.), Jan. 7, 1986, Claims; Examples; Figs. 1, 2., from Microfilm.

Copy of specification and drawings annexed to the request of Japanese Utility Model Application No. 56–124829 (Laid–open No. 58–31005) (Ishikawajima–Harima Heavy Industries, Co., Ltd.), Aug. 25, 1983, Full text; Fig. 1., from Microfilm.

*Primary Examiner*—Tony G. Soohoo
(74) *Attorney, Agent, or Firm*—Wenderoth, Lind & Ponack, L.L.P.

(57) ABSTRACT

The present invention provides a concentration type aggregation reaction apparatus having a concentration screen, which enables an aggregation reaction to be conducted in sludge and the sludge to be concentrated by separation of a liquid by means of a single apparatus. The concentration screen is in a cylindrical form and includes slits having horizontal openings. A decelerating device is connected to an upper portion of a shaft for an agitator for agitation in the tank and brushes are connected to the decelerating device. The brushes are adapted to revolve along opposite surfaces (on a primary side and a secondary side) of the screen. By use of these brushes, aggregates adhered to the screen are continuously removed.

8 Claims, 2 Drawing Sheets

U.S. PATENT DOCUMENTS 4,750,994 A * 6/1988 Schneider
4,931,180 A * 6/1990 Darchambeau
5,069,784 A 12/1991 Taniguchi et al.
5,160,041 A * 11/1992 Taniguchi et al.
5,254,076 A * 10/1993 Chow et al.
5,314,076 A * 5/1994 La Place et al.
5,445,740 A * 8/1995 Malone
5,811,259 A * 9/1998 Hall

* cited by examiner

COAGULATION REACTION DEVICE

TECHNICAL FIELD TO WHICH THE INVENTION BELONGS

The present invention relates to an aggregation reaction apparatus which is used for concentrating sludge or semi-liquid waste containing suspended solids, and separating liquid therefrom. Specifically, the present invention relates to a concentration type aggregation reaction apparatus which is capable of effecting an aggregation reaction simultaneously with concentrating sludge containing aggregates and separating liquid therefrom.

TECHNICAL BACKGROUND

In a conventional method for removing suspended solids from sludge or semi-liquid waste, suspended solids in sludge are aggregated by various aggregation methods in a reaction tank, to thereby form pellets, and the sludge in the form of a mixture of pellets and a liquid is subjected to solid/liquid separation in a solid/liquid separation apparatus. By this method, when the concentration of suspended solids in the sludge is low, the volume ratio of the liquid supplied to the solid/liquid separation apparatus to the pellets becomes high and the throughput of the solid/liquid separation apparatus for separation of suspended solids becomes relatively low. As a method for increasing the throughput of the solid/liquid separation apparatus, there has been employed a method of providing a concentration apparatus between the aggregation reaction tank and the solid/liquid separation apparatus or a method of replacing the aggregation reaction tank with a concentration type aggregation reaction apparatus. As compared to the method of providing a concentration apparatus, the method of replacing the aggregation reaction tank with a concentration type aggregation reaction apparatus is inexpensive, and ensures efficient separation using a compact system.

In a concentration type aggregation reaction apparatus in which suspended solids in the sludge or semi-liquid waste are aggregated and the sludge containing pellets is concentrated and subjected to solid/liquid separation, the pellets grow so as to have a particle diameter of from about 2 to 10 mm. A liquid containing the pellets is partially passed through slits for separation provided in the reaction apparatus and discharged to the outside of the system, thus concentrating the liquid containing the pellets (suspension liquid).

FIG. 2 is a general vertical cross-sectional view of a typical example of a conventional concentration type aggregation reaction apparatus. Referring to FIG. 2, explanation is made with regard to how treatment of sludge is conducted by means of the concentration type aggregation reaction apparatus. In FIG. 2, a concentration type aggregation reaction apparatus 1 is substantially in the form of a vertical cylinder. A sludge feeding pipe 6 and a polymer feeding pipe 7 are connected to a lower portion of a side of the reaction apparatus 1. A concentrated sludge discharge pipe 9 and a separated liquid discharging pipe 19 are, respectively, connected to an upper portion and an intermediate portion of the side of the reaction apparatus. A driving device 12 is provided at an upper portion of the reaction apparatus 1. The driving device 12 revolves an agitating blade 15 and a scraper 21, which are connected to a shaft 14 so as to agitate the sludge in an aggregation reaction tank 2 of the reaction apparatus 1. A screen 3 having slits for separation of liquid is arranged in a form obtained by providing horizontally-positioned ring-shaped wedge wires vertically in a stacked configuration and fixing these wires by means of support bars. This structure of the screen is the same as that of FIG. 3 showing ring-shaped wedge wires 22 and support bars 23.

A draft tube 5 is provided in a central portion of the inside of the aggregation reaction tank 2, so as to increase an upward flow velocity on a surface of the screen 3. Sludge is agitated by the agitating blade 15 and flows upward along an inner wall surface of the aggregation reaction tank 2. While the sludge moves upward through a space between the inner wall surface and the draft tube 5 toward the screen 3, suspended solids in the sludge aggregate, to thereby form aggregate pellets. The pellets are subjected to solid/liquid separation at the slits of the screen 3. The liquid which has passed through the screen 3 is discharged from the separated liquid discharge pipe 19 to the outside of the system, thus increasing the concentration of the suspended solids in the sludge in the tank 2. The concentrated sludge is transferred from the concentrated sludge discharge pipe 9 to a solid/liquid separation apparatus. The separated liquid spontaneously flows, while a flow rate thereof is controlled by a telescope valve 18.

Thus, while the sludge is agitated by an agitator provided in the apparatus, aggregates such as aggregate pellets generally remain in the tank for several minutes and are transferred to a subsequent process in the form of concentrated sludge. However, the pellets remaining in the aggregation reaction tank are likely to adhere to and accumulate on the screen at the slits thereof, thus preventing discharge of the separated liquid. In this case, an effective area of the slits for separation decreases, thereby lowering efficiency of concentration. Therefore, adhesion and accumulation of the aggregate pellets is generally prevented by increasing a cross-flow velocity on a slit surface of the screen or providing a scraper 21 or a brush in the vicinity of the slit surface. From the viewpoint of simplification of a structure of the apparatus, it is desirable that mechanisms for preventing clogging of slits, such as those mentioned above, function without requiring a new driving apparatus. Therefore, in many cases, the mechanism for preventing clogging of the slits is imparted with a simple structure which utilizes a driving force of the agitator in the tank.

DESCRIPTION OF THE INVENTION

PROBLEMS THAT THE INVENTION IS TO SOLVE

However, an effect of the clogging-preventing mechanism having a simple structure vary, depending on the properties of aggregates produced. Illustratively stated, the degree of adhesion of the aggregates to the slit surface of the screen varies and the mechanism cannot necessarily function as desired, depending on the viscosity of the aggregate pellets and liquid and the particle diameter and shear strength of the aggregate pellets. For example, the conventional clogging-preventing mechanism is satisfactorily effective when the pellets have a relatively large particle diameter and high shear strength, as in the case of treatment of sludge produced in a sewage disposal plant or an activated sludge treatment facility. However, when an aggregation reaction is conducted with respect to a special type of sludge containing particles having an extremely small diameter and having an extremely low content of inorganic matter, which inorganic matter affects the shear strength of the pellets, the pellets are likely to have extremely low shear strength, so that part of the pellets break and clog the slits. In this case, an effect of the clogging-preventing mechanism utilizing a cross flow or a scraper can be insufficient. That is, when the sludge particles or pellets have an extremely small particle diameter and low shear strength and are brittle, conventional concentration type aggregation reaction apparatuses cannot be suitably used.

Accordingly, it is an object of the present invention to obviate the above-mentioned disadvantages accompanying conventional techniques. It is an object of the present invention to provide a concentration type aggregation reaction apparatus which includes a mechanism for preventing clogging of slits of a screen by means of a simple structure, without using a driving device other than an agitator for an aggregation reaction, to thereby maintain stable efficiency of concentration.

MEANS OF SOLVING THE PROBLEMS

In order to achieve the above-mentioned objects, the present invention provides a concentration type aggregation reaction apparatus having a concentration screen, which enables an aggregation reaction to be conducted in sludge and the sludge to be concentrated by separation of a liquid by means of a single apparatus. The concentration screen is in a cylindrical form and includes slits having horizontal openings. A decelerating device is connected to an upper portion of a shaft for an agitator for agitation in the tank and brushes are connected to the decelerating device. The brushes are adapted to revolve along opposite surfaces (on a primary side and a secondary side) of the screen. By use of these brushes, aggregates adhered to the screen are continuously removed. In the present invention, "primary side" means the side of the screen facing the sludge and "secondary side" means the side of the screen facing a separated liquid.

The brushes may be arranged so that a clearance between tips of bristles of the primary-side brush and the primary side of the screen is 0 to 5 mm while a clearance between tips of bristles of the secondary-side brush and the secondary side of the screen is 0 to 10 mm, and the decelerating device may have a deceleration ratio of 1/5 to 1/15. By this arrangement, the sludge adhered to the screen can be efficiently removed.

It is most preferred that the clearance between the tips of the bristles of the primary-side brush and the primary side of the screen be 0 mm. However, the clearance of 0 mm is difficult to obtain in terms of manufacture. Therefore, the preferred range of the clearance between the tips of the bristles of the primary-side brush and the primary side of the screen is made 0 to 5 mm. With respect to the clearance between the tips of the bristles of the secondary-side brush and the outer side (secondary side) of the screen, due to the presence of support bars provided vertically on the secondary side of the screen, the amount of wear of the brush becomes large when the clearance is 0 mm. Therefore, it is preferred that the clearance between the tips of the bristles of the secondary-side brush and the secondary side of the screen be made about 0 to 10 mm.

EXPLANATION OF REFERENCE NUMERALS

1: aggregation reaction apparatus, 2: aggregation reaction tank, 3: screen, 4: sump for a separated liquid, 5: draft tube, 6: sludge feeding pipe, 7: polymer feeding pipe, 8: connecting pipe for a separated liquid, 9: concentrated sludge discharge pipe, 10: primary-side brush, 11: secondary-side brush, 12: driving device, 13: decelerating device, 14: shaft, 15: agitating blade, 16: baffle, 17: sludge guide plate, 18: telescope valve, 19: separated liquid discharge pipe, 20: spray nozzle, 21: scraper, 22: wedge wire, 23: support bar, 24: brush, 25: bristle

BEST MODE FOR CARRYING OUT THE INVENTION

Figure 2:
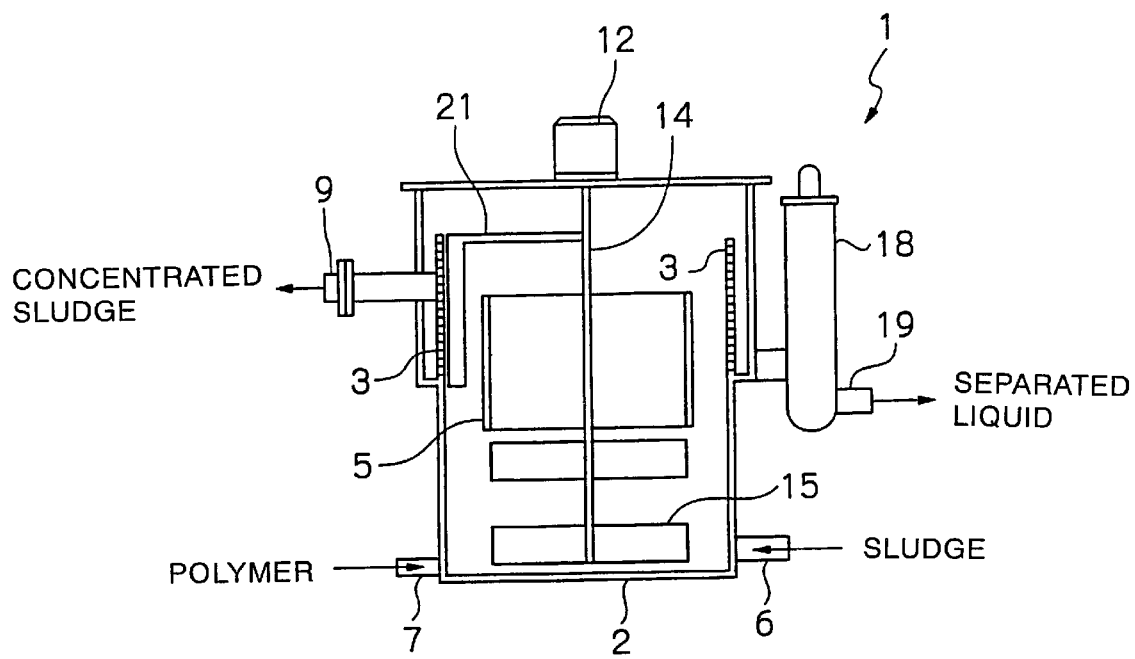
FIG. 2 shows a general view for explaining a conventional concentration type aggregation reaction apparatus.
Figure 3:
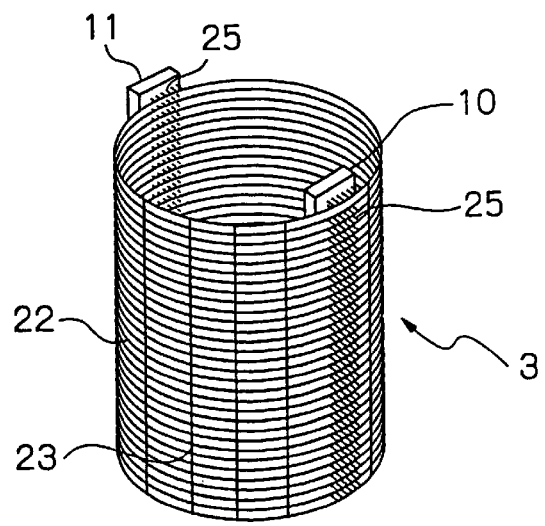
FIG. 3 shows a perspective view of a concentration screen used in the concentration type aggregation reaction apparatus of the present invention.

The present invention is illustratively described, in comparison to a conventional concentration type aggregation reaction apparatus of FIG. 2 (hereinafter, frequently referred to as "the conventional apparatus").

Figure 1:
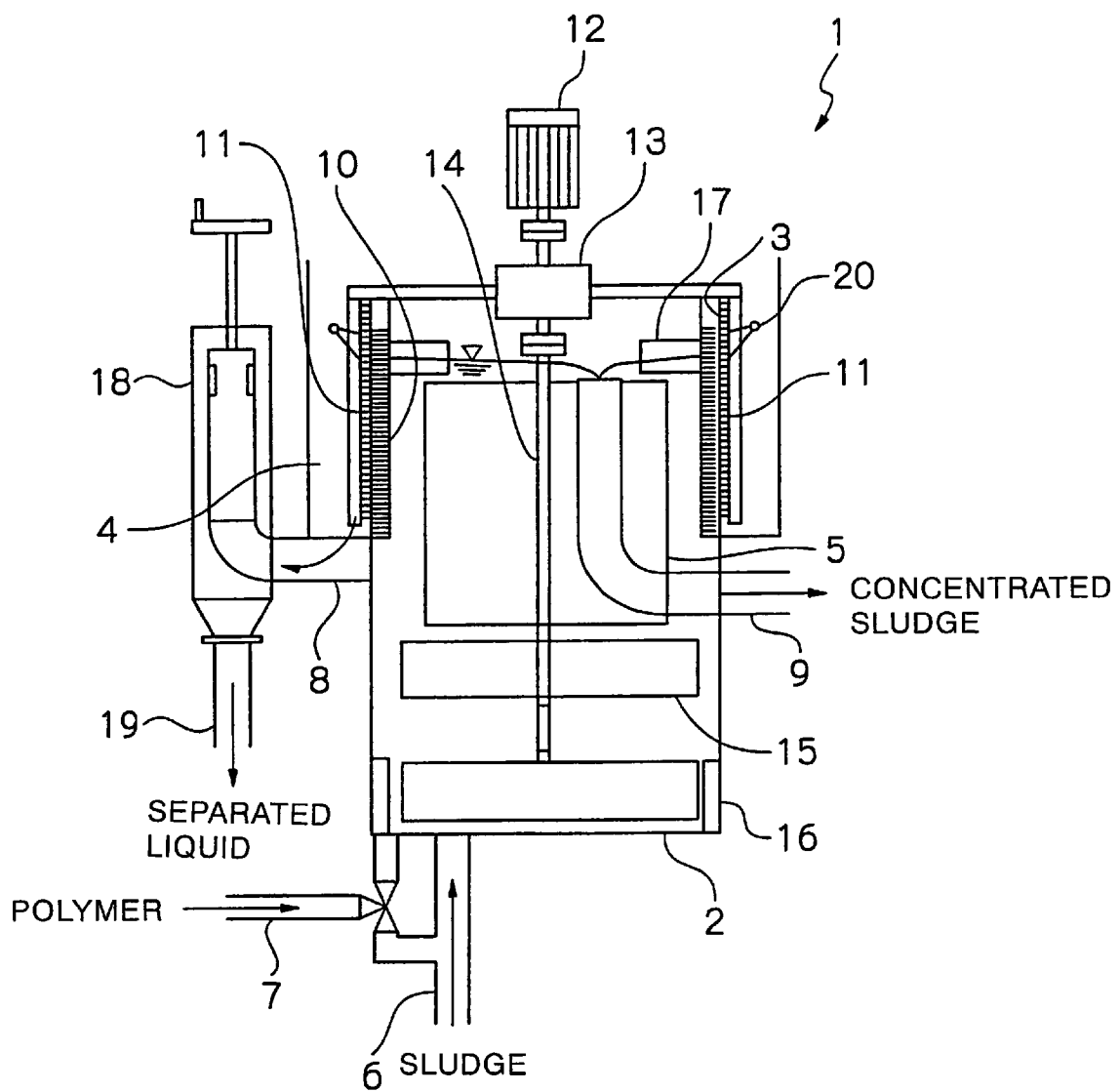
FIG. 1 shows a general view for explaining a concentration type aggregation reaction apparatus of the present invention.

FIG. 1 shows a general view of a concentration type aggregation reaction apparatus according to an embodiment of the present invention (hereinafter, frequently referred to as "the apparatus of the present invention"). In the apparatus of the present invention, two primary-side brushes 10 revolve on a primary-side surface (inner surface) of the screen 3 and two secondary-side brushes 11 revolve on a secondary-side surface (outer surface) of the screen 3. The brushes are connected to the agitating blade through the decelerating device 13 having a deceleration ratio of 1/8. The diameter of the bristle of the primary-side brush 10 is 1.0 mm and the clearance between tips of the bristles of the primary-side brush and the screen 3 is 1 mm. The diameter of the bristle of the secondary-side brush 11 is 0.15 mm and the clearance between tips of the bristles of the secondary-side brush and the screen 3 is 3 mm. Because two types of brushes are disposed so as to hold the screen therebetween, the concentrated sludge discharge pipe 9 has a discharge opening in the vicinity of the center of a liquid surface in the reaction tank 2 and discharges the sludge to the outside of the tank through an intermediate portion of a side surface of the tank. Details of the remaining portions of the apparatus of the present invention are the same as those of the conventional apparatus.

In the conventional apparatus, it is possible to conduct an aggregation reaction and concentration, with respect to sludge after sewage disposal or excess sludge after activated sludge treatment of various industrial liquid wastes. However, when the pellets obtained by an aggregation reaction have extremely low shear strength, the pellets are reduced in size due to the effect of an agitating force in the tank, so as to have a particle diameter of about 1 to 5 mm. A part of these pellets can be further pulverized in size so as to have a particle diameter of 1 mm or less, due to friction against the primary-side surface of the screen or the scraper. The pulverized pellets having a particle diameter of 1 mm or less (hereinafter, frequently referred to as "pulverized pellets"), together with a liquid, pass through the screen and enter the sump for a separated liquid. Otherwise, the pulverized pellets can be accumulated on thickness portions of the wedge wires 22 of the screen and clogs the slit openings of the screen. Especially, when a polymer coagulant having high viscosity is used alone as an aggregating agent and the amount of the aggregating agent reaches a relatively excessive level, the pulverized pellets present in the separated liquid sump 4 or on the thickness portions of the wedge wires aggregate again, due to the excess of the aggregating agent, and strongly adhere to the thickness portions of the wedge wires or the secondary-side surface of the screen. Therefore, substantial time can be required for spontaneous peeling of the adhered pellets.

In the apparatus of the present invention, the brushes 10 and 11 revolve on the primary-side surface and the secondary-side surface of the screen 3. Therefore, adherence of the pellets is unlikely to occur on each of the primary side (inner side) and the secondary side (outer side) of the screen 3. During movement of the brushes, the secondary-side brush 11 makes contact with vertical support bars 23 welded to the secondary side of the screen 3. Therefore, the bristles of the secondary-side brush 11 are intermittently bent and restored in a straight form, to thereby generate a flow of the sludge through the slits from the secondary side to the primary side of the screen. This flow of the sludge reduces accumulation of the pulverized pellets on the thickness portions of the wedge wires 22. The bristles of the secondary-side brush 11 revolve while intermittently making contact with the support bars 23. Therefore, as the material for the bristles, it is preferred to use a material which has excellent wear resistance and is capable of being easily restored when bent.

In the aggregation reaction apparatus of FIG. 1, in order to increase an effect of agitation, a baffle 16 may be provided at a lower portion of an inner wall surface of the reaction tank 2. A sludge guide plate 17 may be provided at an upper portion of the inner wall surface of the reaction tank 2, in order to facilitate discharge of the concentrated sludge. In order to suppress clogging of an upper portion of the screen 3, a spray nozzle 20 may be provided at an upper portion of the reaction tank 2.

EXAMPLE

Next, explanation is made in detail with respect to an example of results of operation of the concentration type aggregation reaction apparatus according to an embodiment of the present invention. The concentration type aggregation reaction apparatus used in this embodiment has the same structure as that of FIG. 1. The effective volume of the apparatus is 1.4 m$^3$ and the effective screen area of the apparatus is 2.5 m$^2$. As sludge to be treated, use was made of sludge generated in a liquid waste disposal plant. As an aggregating agent, a cation type polymer coagulant was used alone. The sludge from the liquid waste disposal plant had a high content of organic matter and decomposition of the sludge was highly advanced. When an aggregation reaction was conducted by using the polymer coagulant alone, aggregate pellets which have extremely low shear strength and are brittle were obtained. The sludge was concentrated by about two times and the feeding rate of the sludge was 30 to 50 m$^3$/hour. Concentration of the sludge varied by 0.8 to 1.5%. The amount ratio of the polymer coagulant to the SS (suspended solids) in the sludge was about 0.7%. Under these conditions, 24-hour continuous operation of the apparatus was conducted for about 3 months. Results are shown in Table 1.

TABLE 1

Results of Example

| Item | Range | Average value |
|---|---|---|
| Throughput | 30 to 50 m$^3$/hour | 42 m$^3$/hour |
| SS concentration in separated liquid | 62 to 880 mg/liter | 440 mg/liter |
| Concentration of concentrated sludge | 2.1 to 3.5% | 2.7% |
| The number of days of continuous operation | 90 days or more | |

Average values of the results are as follows: throughput: 42 m$^3$/hour; SS concentration of separated liquid: 440 mg/liter; and SS concentration of concentrated sludge: 2.7%. Continuous operation of the apparatus could be conducted for 90 days or more. In view of the fact that an average value of the SS concentration of a treated liquid is several hundred mg/liter or less, it is considered that concentration/separation could be satisfactorily conducted.

EFFECTS OF THE INVENTION

By use of the concentration type aggregation reaction apparatus of the present invention, clogging of slits for separation can be avoided and high performance of concentration/separation can be maintained for a long period of time without using a driving device other than an agitator for an aggregation reaction, even when aggregate pellets are extremely brittle and small.

As is apparent from the above-mentioned example, in the concentration type aggregation reaction apparatus of the present invention, treatment of sludge could be conducted with a high throughput and a separated liquid having a low SS concentration can be obtained as a treated liquid. The concentration of the concentrated sludge was, for example, about 2.7%. Such a treatment could be conducted by continuous operation for 90 days or more. The average value of the SS concentration of a treated liquid was 440 mg/liter. Therefore, it can be said that concentration/separation could be satisfactorily conducted.

What is claimed is:

1. A concentration type aggregation reaction apparatus for conducting an aggregation reaction and concentration of a liquid to be treated, comprising:

a reaction tank substantially in a cylindrical form;

a concentration screen substantially in a cylindrical form, which is located at an upper portion of the reaction tank; and a shaft for an agitator for agitation in the tank, the shaft vertically extending through a substantially central portion of the reaction tank and the concentration screen, wherein the concentration screen includes slits having horizontal openings, a decelerating device is connected to an upper portion of the shaft for the agitator, brushes adapted to revolve along a primary side and a secondary side of the concentration screen are connected to the decelerating device and aggregates adhered to the concentration screen are continuously removed.

2. A concentration type aggregation reaction apparatus according to claim 1, wherein the brushes comprise a primary-side brush having bristles each having a diameter of 0.5 to 1.5 mm and a secondary-side brush having bristles each having a diameter of 0.05 to 0.9 mm, wherein a clearance between tips of the bristles of the primary-side brush and the primary side of the screen is 0 to 5 mm and a clearance between tips of the bristles of the secondary-side brush and the secondary side of the screen is 0 to 10 mm and wherein the decelerating device has a deceleration ratio of 1/5 to 1/15.

3. A concentration type aggregation reaction apparatus according to claim 2, further comprising:

a baffle plate disposed within the reaction tank so as to facilitate an effect of agitation;

a guide plate disposed above an agitating blade so as to facilitate discharge of sludge;

a draft tube for increasing a flow velocity on a surface of the concentration screen; and a spray nozzle for reducing clogging of the concentration screen, wherein the sludge and an aggregating polymer are fed to the cylindrical reaction tank and the sludge after concentration is discharged to an outside of the apparatus through a concentrated sludge discharge pipe having a discharge opening in the vicinity of the center of a liquid surface in the reaction tank.

4. A concentration type aggregation reaction apparatus according to claim 3, wherein the concentration screen comprises a plurality of horizontally-positioned ring-shaped wedge wires arranged vertically in a stacked configuration, the wedge wires being fixed by means of vertical support bars.

5. A concentration type aggregation reaction apparatus according to claim 2, wherein the concentration screen comprises a plurality of horizontally-positioned ring-shaped wedge wires arranged vertically in a stacked configuration, the wedge wires being fixed by means of vertical support bars.

6. A concentration type aggregation reaction apparatus according to claim 1, further comprising:

a baffle plate disposed within the reaction tank so as to facilitate an effect of agitation;

a guide plate disposed above an agitating blade so as to facilitate discharge of sludge;

a draft tube for increasing a flow velocity on a surface of the concentration screen; and a spray nozzle for reducing clogging of the concentration screen, wherein the sludge and an aggregating polymer are fed to the cylindrical reaction tank and the sludge after concentration is discharged to an outside of the apparatus through a concentrated sludge discharge pipe having a discharge opening in the vicinity of the center of a liquid surface in the reaction tank.

7. A concentration type aggregation reaction apparatus according to claim 6, wherein the concentration screen comprises a plurality of horizontally-positioned ring-shaped wedge wires arranged vertically in a stacked configuration, the wedge wires being fixed by means of vertical support bars.

8. A concentration type aggregation reaction apparatus according to claim 1, wherein the concentration screen comprises a plurality of horizontally-positioned ring-shaped wedge wires arranged vertically in a stacked configuration, the wedge wires being fixed by means of vertical support bars.

* * * * *

UNITED STATES PATENT AND TRADEMARK OFFICE
CERTIFICATE OF CORRECTION

PATENT NO.     : 6,386,752 B1
DATED          : May 14, 2002
INVENTOR(S)    : Takao Hagino et al.

It is certified that error appears in the above-identified patent and that said Letters Patent is hereby corrected as shown below:

<u>Title page,</u>
Item [54], Title, please change "COAGULATION REACTION DEVICE" to
-- AGGREGATION REACTION APPARATUS --.

Signed and Sealed this

Twenty-third Day of December, 2003

JAMES E. ROGAN
*Director of the United States Patent and Trademark Office*